United States Patent [19]

Hensler

[11] Patent Number: 4,746,024
[45] Date of Patent: May 24, 1988

[54] AERIAL BOOM WITH TENSIOMETER

[75] Inventor: David Hensler, Fort Wayne, Ind.

[73] Assignee: Hydra-Tech, Inc., Ft. Wayne, Ind.

[21] Appl. No.: 35,536

[22] Filed: Apr. 7, 1987

[51] Int. Cl.$^4$ ............................................. B66C 13/16
[52] U.S. Cl. ................................... 212/158; 212/264; 182/2
[58] Field of Search ............... 212/150, 155, 157, 158, 212/229, 232, 264; 182/2

[56] References Cited

U.S. PATENT DOCUMENTS

| 2,118,727 | 5/1938 | Hanes . | |
| 3,278,925 | 10/1966 | Saunders et al. | 212/158 |
| 3,756,423 | 9/1973 | Rathi . | |
| 3,990,584 | 11/1976 | Strawson et al. | 212/158 |
| 4,003,482 | 1/1977 | Cheze . | |
| 4,098,410 | 7/1978 | Nixon et al. . | |
| 4,359,137 | 11/1982 | Merz et al. | 212/157 |
| 4,582,206 | 4/1986 | Johnson | 212/229 |

Primary Examiner—Joseph F. Peters, Jr.
Assistant Examiner—Stephen P. Avila
Attorney, Agent, or Firm—Baker & Daniels

[57] ABSTRACT

Tensiometer placed on the free end of an aerially articulable boom such that the tensiometer's load indicator is visible from the bucket. A cable extending from the boom's free end may be attached to a working object such as a transformer. When the boom is raised, the working object is lifted off the ground. The tension placed on the cable causes a readout on the tensiometer indicating the load on the cable. Thus, a worker in the bucket can immediately determine whether the load on the cable exceeds the allowable limits.

18 Claims, 4 Drawing Sheets

AERIAL BOOM WITH TENSIOMETER

FIELD OF THE INVENTION

This invention relates to aerial booms, and in particular, to those with buckets on one end, commonly known as "aerial lift devices" or "cherry pickers."

BACKGROUND OF THE INVENTION

Aerial lift devices are often used to service sign posts, wires on telephone poles and the like. These devices usually include a boom with a bucket at one end. An operator standing in the bucket is able to control the movement of the boom. Many aerial lift devices include winches at the end of the boom adjacent to the bucket to lift working objects such as transformers and signs to elevated work areas. The working object is attached to a winch cable, and the bucket and working object are simultaneously lifted by the boom.

Each aerial lift has a limited lifting capacity. When this capacity is exceeded, the lift becomes unstable and is subject to tipping over. Therefore it is helpful for an aerial lift to have a method of measuring the load on a winch connected to the boom. Prior art devices measure the pressure in hydraulic cylinders used to move the boom. However, this pressure measurement cannot be directly converted into an accurate weight measurement because the pressure of a hydraulic cylinder varies with the elevational angle of the boom. Moreover, even if an accurate measurement were possible, a load measurement based on hydraulic cylinder pressure measures the load on the entire boom, instead of the load on just the winch.

Other lifting devices, such as cranes, use tensiometers to measure the load on the end of a jib. A tensiometer measures the tension of a cable, which can be directly converted to a measurement of the load on the cable. The tensiometer is located in the cab of the crane so it is visible to the operator. This arrangement is not helpful for aerial lift devices for two reasons. First, winch cables on aerial lifts do not traverse the length of the boom as with cranes. Second, the operator of an aerial lift is located in the bucket at the end of the boom, and is thus unable to read tensiometer located at the opposite end of the boom. Therefore the present state of the art provides no method for the operator of an aerial lift device to obtain a quick and accurate measurement of the load on a winch located at the end of a boom.

SUMMARY OF THE INVENTION

The invention comprises a tensiometer placed on the free end of an aerially articulable boom such that the tensiometer's load indicator is visible from the bucket. A cable extending from the boom's free end may be attached to a working object such as a transformer. When the boom is raised, the working object is lifted off the ground. The tension placed on the cable causes a readout on the tensiometer indicating the load on the cable. Thus, a worker in the bucket can immediately determine whether the load on the cable exceeds the allowable limits.

DESCRIPTION OF THE PREFERRED EMBODIMENT

Figure 1:
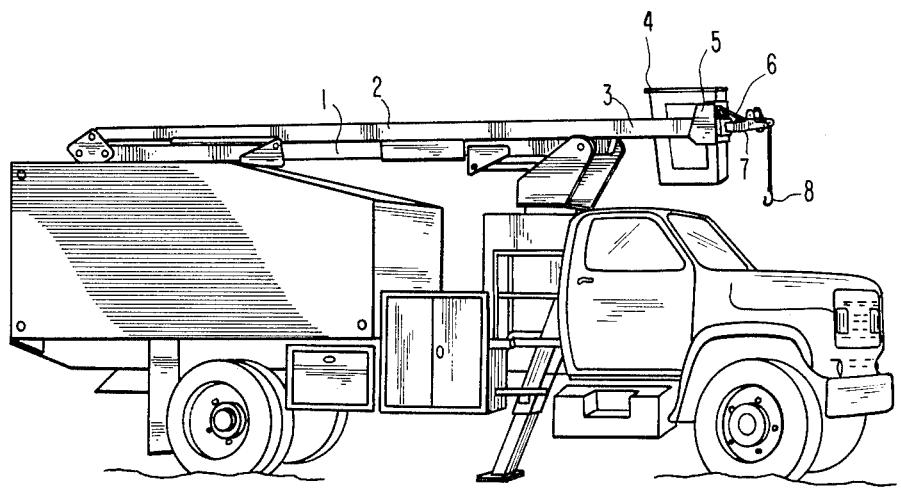
FIG. 1 is a perspective view of an aerial lift device to which the invention can be applied.

Referring to the drawings, in FIG. 1 there is shown an aerial lift device or "cherry-picker" to which the apparatus of this invention may be applied. The aerial lift device 1 includes lower boom 1 and upper boom 2. The free end 3 of the upper boom has bucket 4 and motorized winch 5 attached thereto. Movement of the lower boom, upper boom, and motorized winch may be effected via controls (not shown) located in bucket 4. Cable 6 extends from motorized winch to winch pole 7. A hook 8 attached to the end of said cable allows working objects to be attached to the cable, and raised by either the motorized winch 5 or movement of upper boom 2.

Figure 2:
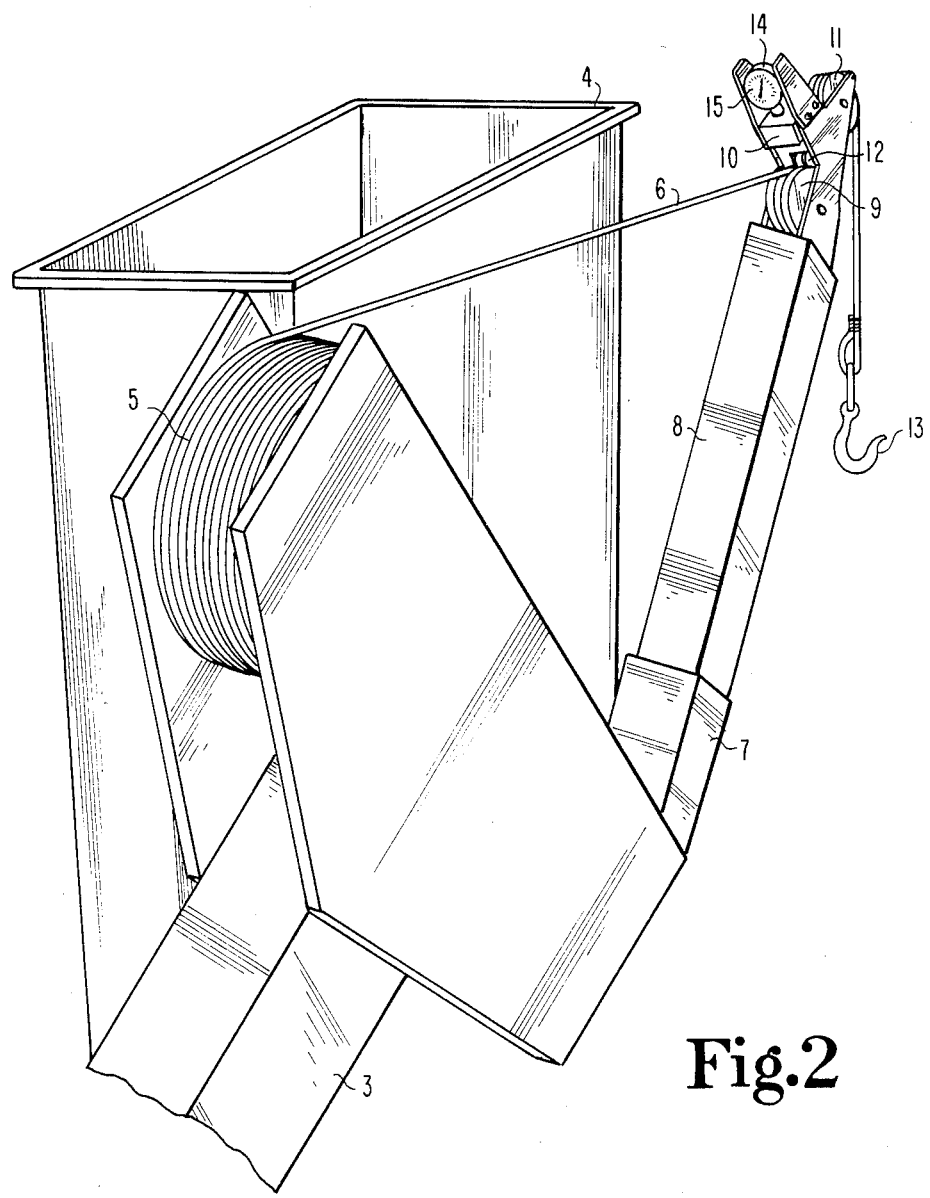
FIG. 2 is a perspective view of the free end of a boom having a winch pole employing the invention.

Referring to FIG. 2, winch pole 7 is mounted on the free end of upper boom 3 adjacent to bucket 4. The vertical angle of winch pole 7 relative to the upper boom may be adjusted via controls located in bucket (not shown). Housing 8 extends from the end of the winch pole. Mounted in said housing are first pulley 9, tensiometer 10, and second pulley 11. Tensiometer 10 includes retractable pulley 12. Cable 6, which extends from motorized winch 5, is placed over first pulley 9, under retractable pulley 12, and over second pulley 11. Although the winch is motorized in the preferred embodiment, such a limitation is not necessary. The terminal end of cable 6 is attached to hook 13, to which a working object may be attached. As the weight borne by cable 6 increases, so does the tension of the cable. The increased tension causes retractable pulley to be deflected towards tensiometer gage 14, which acts as a load indicating means. Gage 14 includes gage decal 15, which may be replaceable to indicate different scales to correspond to the particular dimensions and distance between the first and second pulleys 9 and 11, retractable pulley 12, and cable 6.

Figure 3:
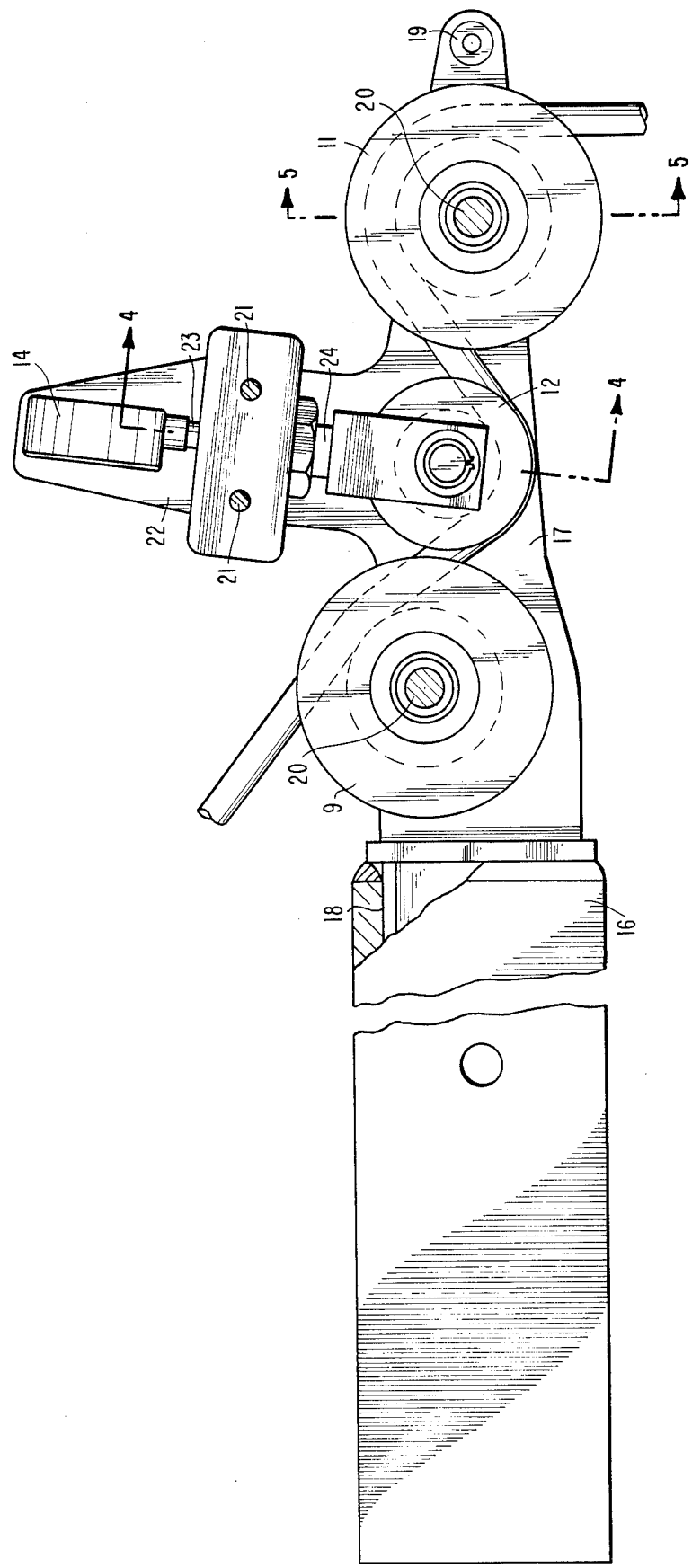
FIG. 3 is a horizontal section of the winch pole shown in FIG. 2.

Referring to FIG. 3, there is shown winch pole stub 16, in which is mounted housing 17. The housing may be secured to the interior of the winch pole via an epoxy bond 18. The first and second pulleys and the tensiometer are mounted in housing 17. It should be understood that it is possible to mount the pulleys and tensiometer directly in free end of the upper boom without departing from the spirit of the invention, but in the preferred embodiment they are mounted in a winch pole comprising a part of the boom. At the tip of the housing, its opposite sides are welded to shaft 19 to provide structural integrity. Mounted in housing 17 are first pulley 9 and second pulley 11 via shafts 20. Housing 17 is attached by nuts 21 to gage guard 22, which surrounds tensiometer 23. The tensiometer includes a retractable pulley 12 connected to spool 24, which causes a reading to be made by gage 4 when retractable pulley is deflected towards tensiometer body 23. It is necessary to position the tensiometer so that its spool 24 is midway between and perpendicular to the centers of pulleys 9 and 11.

Figure 4:
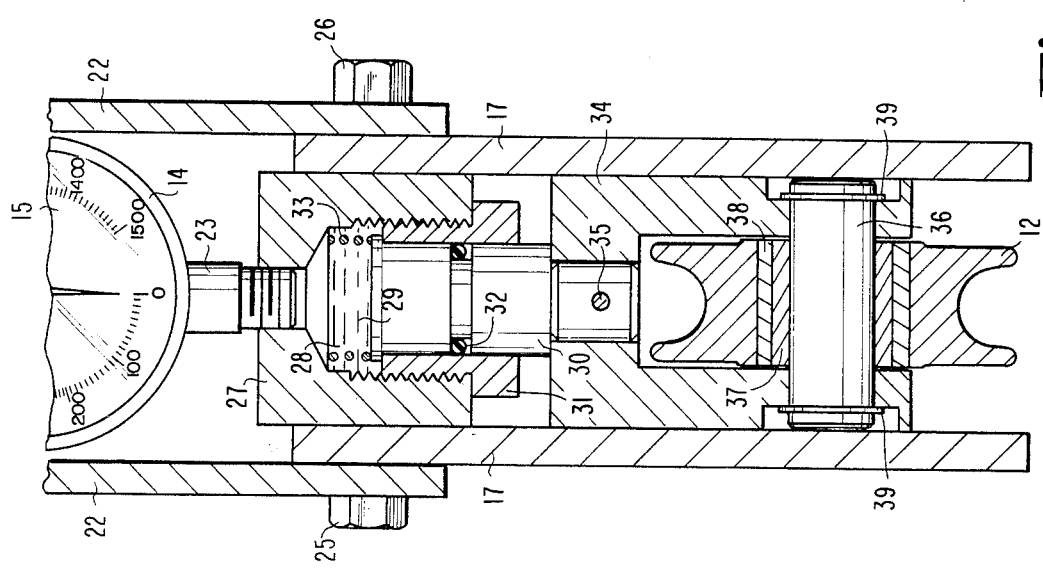
FIG. 4 is a vertical section of the load indicating device as mounted in the winch pole taken in the plane of the line A—A of FIG. 3.

Referring to FIG. 4 tensiometer 23 is mounted in housing 17 by nuts 25 secured by bolts 26. Said nuts also secure gage guards 22 to said housing. Tensiometer 23 includes a hydraulically responsive gage 14, which is mounted in hydraulic load cell 27. The hydraulic load cell contains a cavity 28 which is filled with hydraulic oil 29. Cavity 28 of load cell 27 should also have some air therein. However, too much air can result in load cell damage and too litte air can result in incorrect gage readings. In the preferred embodiment, the proper amount of oil will allow spool 30 to be depressed approximately 1/10" before going solid and causing a gag reading. It should be understood that although a hydraulic tensiometer is employed in the preferred embodiment, other varieties of tensiometers may be used without departing from the spirit of the invention. The lower portion of cavity 28 is enclosed by spool 30, which downwardly extends from hydraulic load cell 23, and is sealed by load cell nut 31 and O ring 32. Spool 30 is biased away from the top of cavity 28 by spring 33, and is secured to pulley idler block 34 by via roll pin 35. Pulley 12 is mounted in pulley idler block 34 by shaft 36, inner race 37 and sleeve bearing 38. The shaft is secured to the pulley idler block via retaining rings 39.

The readout of gage 14 will vary according to the size of cable 6, and the distance and angle between tensiometer 23 and pulleys 9 and 11. Therefore, it is recommended that these sizes and distances be selected to accommodate a particular application. Alternatively, the gage reference scale 15 may be replaceable in lieu of calibration of these sizes and distances.

Figure 5:
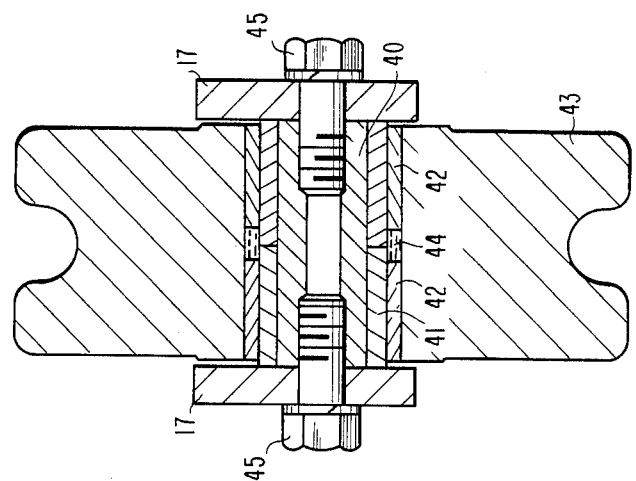
FIG. 5 is a vertical section of the load pulley taken in the plane of the line B—B of FIG. 4.

FIG. 5 discloses means for mounting the pulleys 9 and 11 in housing 17. Inner race 41, sleeve bearing 42, and pulley 43 are respectively placed on shaft 40. Grease may be placed in the gap 44 between said inner races, to reduce friction when said pulley is rotated. The entire assembley is placed between housing 17, and secured by nuts 45.

Although the present invention has been described with reference to the accompanying drawings, it is not limited to that precise embodiment, and various changes and modifications can be effected therein without departing from the scope or spirit of the invention.

I claim:

1. A boom including a load indicating mechanism comprising in combination:
   an aerially articulable boom having a free end,
   a bucket mounted on the free end of said boom,
   first and second cable receiving means mounted on the free end of said boom,
   a tensiometer having a retractable cable receiving means,
   said tensiometer being mounted on the free end of said boom at the midpoint between said first and second cable receiving means and perpendicular thereto whereby said retractable cable receiving means is deflected by a cable running between said first and second cable receiving means when tension is applied to said cable,
   said tensiometer having a load indicator responsive to pressure applied to said retractable cable receiving means,
   such that said load indicator is readable by a person in said bucket.

2. The combination of claim 1, wherein said cable receiving means are comprised of pulleys.

3. The combination of claim 1, wherein said tensiometer is hydraulic.

4. The combination of claim 1, wherein said load indicator comprises a gage.

5. The combination of claim 4, wherein said load indicator includes a replaceable reference scale.

6. A boom including a load indicating mechanism comprising in combination:
   an aerially articulable boom having a free end,
   a bucket mounted on the free end of said boom,
   a winch pole mounted on the free end of said boom,
   first and second cable receiving means mounted on said winch pole,
   a tensiometer having a retractable cable receiving means,
   said tensiometer being mounted on said winch pole at the midpoint between said first and second cable receiving means and perpendicular thereto whereby said retractable cable receiving means is deflected by a cable running between said first and second cable receiving means when tension is applied to said cable,
   said tensiometer having a load indicator responsive to pressure applied to said retractable cable receiving means,
   such that said load indicator is readable by a person in said bucket.

7. The combination of claim 6, wherein said winch pole is articulable with respect to said boom.

8. The combination of claim 6, further comprising a winch mounted on the free end of said boom, and
   a cable extending from said winch placed over said first and second cable receiving means and below said retractable cable receiving means.

9. The combination of claim 8, wherein said winch is motorized.

10. The combination of claim 6, wherein said cable receiving means are comprised of pulleys.

11. The combination of claim 6, wherein said tensiometer is hydraulic.

12. The combination of claim 6, wherein said load indicator comprises a gage.

13. The combination of claim 12, wherein said load indicator includes a replaceable reference scale.

14. The combination of a load indicating mechanism and a boom, comprising in combination:
   an aerially articulable boom having a free end,
   a bucket mounted on the free end of said boom,
   first and second cable receiving means mounted,
   a tensiometer having a retractable cable receiving means,
   said tensiometer being located at the midpoint between said first and second cable receiving means and perpendicular thereto whereby said retractable cable receiving means is deflected by a cable running between said first and second cable receiving means when tension is applied to said cable,
   said tensiometer having a load indicator responsive to pressure applied to said retractable cable receiving means,
   characterized in that said first and second cable receiving means and said tensiometer are located on the free end of said boom and such that said load indicator is readable by a person in said bucket.

15. The combination of claim 14, wherein the cable receiving means are comprised of pulleys.

16. The combination of claim 14, wherein the tensiometer is hydraulic.

17. The combination of claim 14, wherein the load indicator comprises a gage.

18. The combination of claim 14, wherein said load indicator includes a replaceable reference scale.

* * * * *